United States Patent [19]

Orlandi

[11] Patent Number: 4,924,903
[45] Date of Patent: May 15, 1990

[54] 'BREECH-BLOCK' TAP FOR THE SUPPLY OF COLD OR HOT WATER WITH CERAMIC SEALING PLATES

[75] Inventor: Alessio Orlandi, Castiglione D/Stiviere, Italy

[73] Assignee: Galatron, S.r.l., Castiglione D/Stiviere, Italy

[21] Appl. No.: 333,301

[22] Filed: Apr. 4, 1989

[51] Int. Cl.$^5$ .................... F16K 3/16; F16K 11/074
[52] U.S. Cl. ..................... 137/454.5; 137/625.31; 251/304
[58] Field of Search ............. 251/304; 137/454.2, 137/454.5, 454.6, 625.31

[56] References Cited

U.S. PATENT DOCUMENTS

| | | | |
|---|---|---|---|
| 3,780,758 | 12/1973 | DeVries | 137/454.6 |
| 3,831,621 | 8/1974 | Anthony et al. | 137/454.6 X |
| 4,005,728 | 2/1977 | Thorp | 137/454.6 X |
| 4,250,912 | 2/1981 | Knapp | 137/454.6 X |
| 4,610,268 | 9/1986 | Knapp | 137/454.6 |
| 4,678,002 | 7/1987 | Valley | 137/454.5 X |
| 4,821,765 | 4/1989 | Iqbal et al. | 137/454.5 X |

FOREIGN PATENT DOCUMENTS

WO86/07431 12/1986 World Int. Prop. O. ... 137/454.6 X

*Primary Examiner*—John Rivell
*Attorney, Agent, or Firm*—McGlew & Tuttle

[57] ABSTRACT

The invention relates to a 'breech-block' valve for the delivery of cold or hot water with ceramic sealing plates in which a ring which is capable of independent axial displacements is fitted on the base of the valve body in order to take up and compensate for machining play and to stabilize the compacting force on the sealing ceramic plates by means of annular elastic packings independently of the force with which the valve is tightened within the tap body.

7 Claims, 2 Drawing Sheets

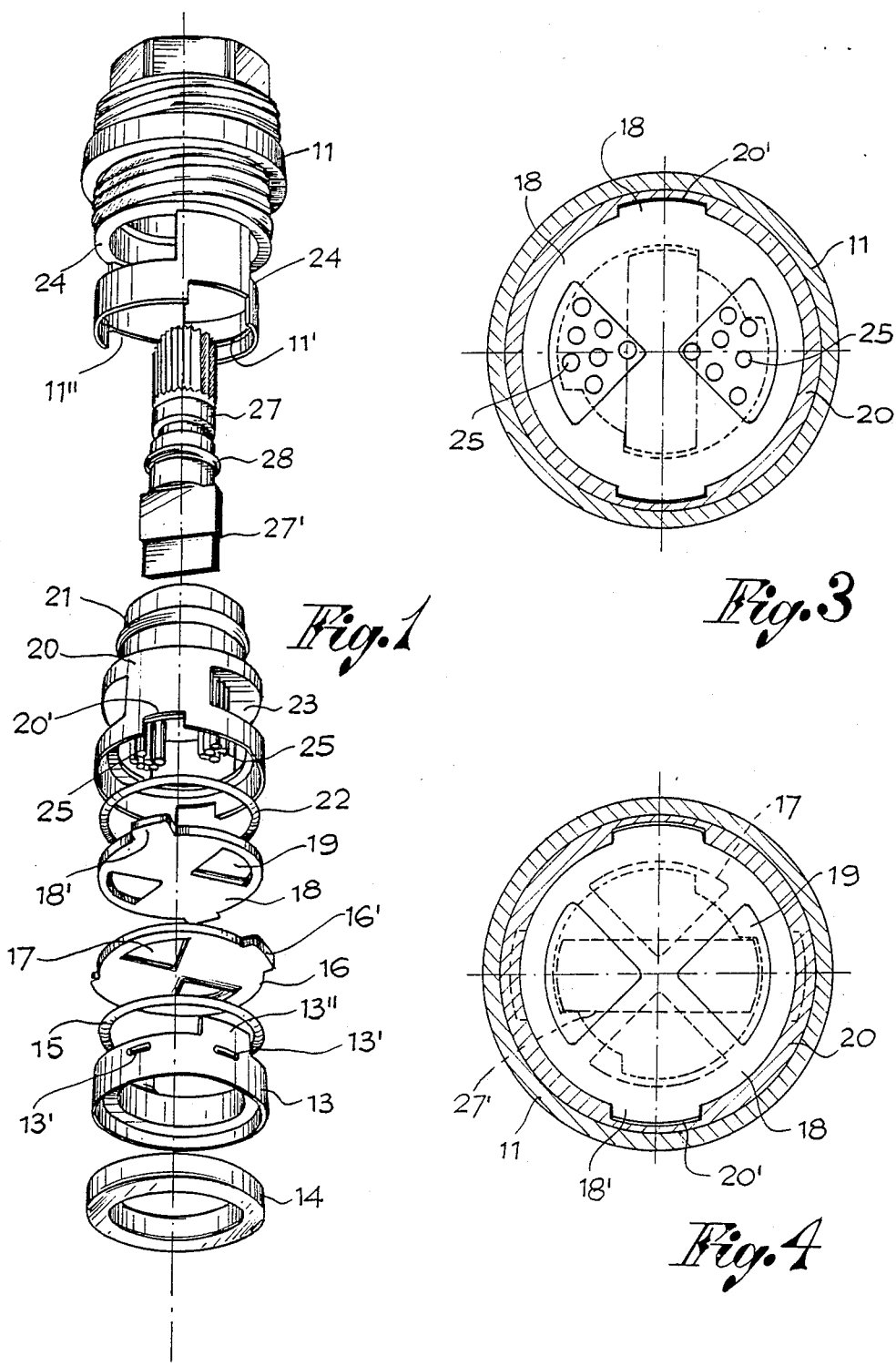

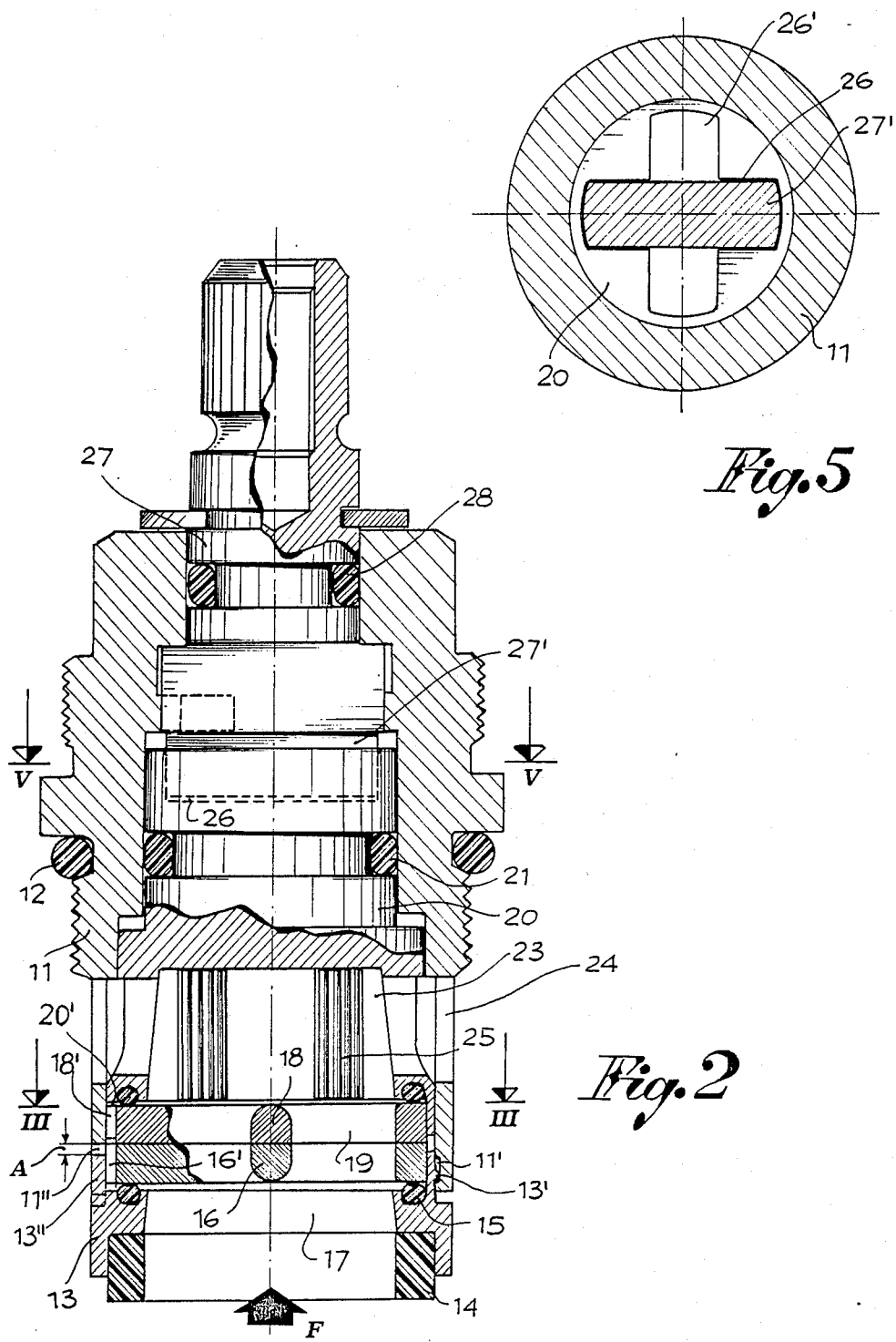

'BREECH-BLOCK' TAP FOR THE SUPPLY OF COLD OR HOT WATER WITH CERAMIC SEALING PLATES

FIELD AND BACKGROUND OF THE INVENTION

This invention relates to a 'breech-block' valve with ceramic plate seals for the delivery of cold or hot water within the context of a tap in sanitary equipment. More particularly the invention relates to a 'breech-block' valve of the type having a hollow cylindrical body which is designed to be screwed into a tap body in line with a pipe supplying the water which is to be delivered, and including internally, from the base upwards, an annular seal, a first ceramic plate which is fixed within the body and has at least one hole for the passage of water, a second ceramic plate, resting on and rotating on the first and having at least one hole which can be positioned in line with and at a distance from the hole in the first plate following a quarter turn or a half turn of the second plate, a follower which is rotatably mounted within the body and keyed to the second plate, and an operating spindle keyed to the follower and provided with a manually operated handgrip to control the second plate via the follower, the cylindrical body and the follower also having radial passages for the water to pass towards the delivery outlet of the tap.

This type of valve is first assembled as an independent unit and is then mounted in the body of the tap in question by being screwed in. Known embodiments of such valves however have the disadvantage that they cannot be correctly adjusted for inevitable machining defects and play in the tap body itself. At present in fact these defects and plays can only be taken up by tightening the valve to greater or lesser extent achieved by screwing it into the tap body and therefore can only be achieved by variable squashing of the packing at the base of the valve. Then however the load is transmitted directly to the ceramic plates, altering their original compaction force and their optimum seal and thus making it more difficult to control opening and closing of the valve, in addition to increasing wear on the plates.

SUMMARY AND OBJECTS OF THE INVENTION

This invention on the other hand is intended to remedy these disadvantages and limitations and therefore provides a valve of the abovementioned type which incorporates some especially advantageous arrangements substantially in accordance with claim 1. In particular these arrangements are intended to:

render the valve unit more functional and reliable without altering its structure and general dimensions, overcome and compensate for defects and machining play between a member which can be moved axially with respect to the valve body without substantially affecting the position of the ceramic plates and the compaction force on them. This member also acts as a damper for water hammer and any external thrusts occurring at the time of assembly, separate the ceramic plates in this way from the system securing and sealing the valve in the body into which it is screwed so that the securing load does not effect the contact load between the said plates, and ensure a constant optimum contact between the ceramic plates by means of elastic O-ring seals.

This invention also provides for the use of a pair of superimposed ceramic plates which are entirely identical and the use of an operating rod which is separate from the following controlling the second plate so that the rod can be replaced in response to any tap assembly requirements, the follower in turn being provided with a double key for the operating rod for right handed and left handed control of the opening of the valve, while all the other components of the structure remain the same.

BRIEF DESCRIPTION OF THE DRAWINGS

Further details of the invention are more particularly described below in the description with reference to the appended drawing in which:

FIG. 1 is an exploded perspective view of the valve,

FIG. 2 is an axial cross-section through the valve mounting assembly,

FIGS. 3 and 4 are views showing the valve when open and closed respectively in transverse cross-sections as indicated by the arrows III—III in FIG. 2, and FIG. 5 is a plan view of the follower with a double key in accordance with the arrows V—V in FIG. 2.

DESCRIPTION OF THE PREFERRED EMBODIMENT

The 'breech-block' valve in question comprises a hollow cylindrical body 11 which is designed to be screwed into place, with an inserted seal 12, in a tap body, which is not shown, in line with a pipe, which is also not shown, supplying hot or cold water which is to be delivered in the direction of arrow F in FIG. 2. In accordance with the invention a ring 13, preferably of plastic material, which can move axially with respect to the body is mounted at the base of the body of valve 11.

This ring 13 has radial means 13' which are designed to snap into a recess or groove 11' in said body 11, and two upward projections 13" which engage spaces 11" provided in the base of the body to prevent rotation of the ring. The coupling between the ring and the body is such that a predetermined mutual axial movement of an amount A is permitted in order to compensate for defects and machining play.

It should be noted that radial means 13' may be either integral with the axially movable ring or may be laid on and if appropriate secured to the ring itself, and that the recess or groove 11' which engages with means 13' is of sufficient depth to permit the axial movement A of the ring.

This ring 13 also has a bottom annular seal 14 below the seat on which it rests, which is intended to seal the tap body around the outlet of the pipe supplying the water, and, at the top, a seat for an elastic O-ring seal 15.

Within body 11 are mounted a first ceramic plate 16, keyed to body 11 by means of two radial projections 16' and resting on the O-ring seal 15 supported by ring 13 and having at least one hole 17 for passage of the water coming from the pipe, and a second ceramic plate 18, rotatably supported on the first and also having at least one hole 19 for the passage of water which can be positioned to be in line with and be at a distance from the hole in the first plate 16 as a result of a quarter turn or a half turn of the second plate. This second plate is identical to the first and has two radial projections 18' by which it is keyed into two corresponding spaces 20' made in the base of a follower member 20 rotatably mounted within body 11 and provided with a peripheral seal 21. A second elastic O-ring seal 22 is mounted between the base follower 20 and the second plate 18. In the base of the follower there is also provided a cavity 23 which opens towards the ceramic plates and is provided with radial recesses communicating with the radial recesses 24 provided in the wall of body 11, thus permitting water to leave in the direction of the tap outlet when the hole of the second rotating plate 18 is in line with the hole in the fixed plate 16 for passage of the water.

Flow diverting rods 25 are provided in the cavity of follower 20 with a view to preventing noise when water is delivered. Two key recesses at right angles 26-26', see FIG. 5, are provided in the top of the follower and through a tongue 27' these engage an operating rod 27 which is also rotatably guided within body 11 with the insertion of a peripheral seal 28 and is fitted with a handgrip or lever.

The operating rod and the follower are therefore separate in that the former can be interchanged in accordance with requirements while the follower and all the other components remain as they are.

On the other hand the double key seat 26, 26' makes it possible for rod 27 to be mounted for both right handed and left handed opening of the valve while the orientation of all the other components remains the same.

The internal components of valve body 11 are mounted in the body itself through its base and are maintained in operation as a result of base ring 13 which engages recess 13', 11' in the said body.

As stated above, base ring 13 is capable of making axial displacements (A) with respect to the body and as a result can be used to take up and compensate for defects and machining play in the body of the tap in which the valve is mounted. The ring can in fact adjust its axial position in relation to the depth of the housing in which the valve is mounted and the axial displacement thereof is permitted and taken up by elastic seals 15, 22 without substantially affecting the force compacting superimposed ceramic plates 16, 18 regardless of the securing load on the valve body.

The specified objectives are thus achieved and permit the valve to be opened and closed correctly with a constant force, the open and closed positions of the valve being illustrated in FIGS. 3 and 4 of the drawing.

Finally it should be noted that without going beyond the scope of the invention the axially movable base ring may be located elsewhere than the lower part of the valve body so as to lie substantially above the plates as shown in the drawing, at a greater height so as to engage the body at the level of the threaded connection in the latter while maintaining the same function, in which case the ring will itself be provided with radial spaces for passage of the water.

I claim:

1. A breech-block valve connectable to a tap body in line with a pipe supplying water for delivery of cold or hot water, comprising:
   a hollow cylindrical body;
   a follower rotatably mounted within the hollow cylindrical body, the cylindrical body and the follower having radial passages for passage of water from the tap body towards a tap outlet;
   an operating rod keyed to the follower and provided with a hand-held hand grip to control rotation of the follower;
   a first ceramic plate positioned within said cylindrical body, said first ceramic plate having at least one hole for passage of water;
   a second ceramic plate in contact with said first ceramic plate and rotatable with respect to said first ceramic plate, said second ceramic plate having at least one hole which can be aligned with said first ceramic plate at least one hole, upon rotation of said second ceramic plate, said follower being keyed to said second ceramic plate;
   a first deformable O-ring seal mounted between said second ceramic plate and said follower;
   a second elastic deformable O-ring seal mounted adjacent said first ceramic plate; and
   a ring connected to said cylindrical body by connection means for limited axial movement of said ring with respect to said cylinder body without rotation of said ring with respect to said cylindrical body, said second elastic deformable O-ring being positioned between said ring and said first ceramic plate and an opposite end of said engaging an additional sealing ring, said ring and connection means cooperating with said first and second O-rings to take up and compensate for defects or machining play independently of the compaction of the first and second ceramic plates, thereby allowing variable axial positioning of said ring with respect to said cylindrical body without limiting the movement of said second ceramic plate with respect to said first ceramic plate.

2. A 'breech-block' valve according to claim 1, wherein said axially movable ring (13) connection means includes radial means (13') for engaging the cylindrical body with axial play and upward projections (13") which engage said cylindrical body to prevent rotation of said ring, said ring comprising means for holding in place an assembly of the internal components of the valve.

3. A 'breech-block' valve according to claim 2, wherein said radial means (13') are integral with or rest upon said axially movable ring (13) and snap into at least one recess or groove provided in said cylindrical body of the valve, said at least one recess or groove being at a lower or higher level with respect to said ceramic plates (16,18) and having a height (A) sufficient to allow axial movement of said ring.

4. A 'breech-block' valve according to claim 1, said ceramic plates (16,18) are identical and each plate includes a pair of radial projections (16',18'), said first plate (16) keying into said cylindrical body by means of its radial projections (16'), while the second plate (18) is keyed to said follower (20) through its radial projections (18').

5. A 'breech-block' valve according to claim 1, wherein the follower (20) bears integral flow-breaking-/noise-preventing rods which project towards the ceramic plates.

6. A 'breech-block' valve according to claim, wherein said follower (20) and said operating rod (27) are connected separably and interchangeably, said operating rod (27) having a tongue end (27') which engages a seat (26) provided in the top of said follower (20).

7. A 'breech-block' valve according to claim 6, in which two key seats at right angles (26,26') are provided in the top of said follower (20), said tongue end (27') of said operating rod (27) engaging one or the other of the said seats in accordance with the direction in which openings of the valve is controlled.

* * * * *